United States Patent
Peters

[15] 3,695,545
[45] Oct. 3, 1972

[54] SEAT BELT RETRACTOR

[72] Inventor: Theodore F. Peters, Utica, Mich.

[73] Assignee: General Motors Corporation, Detroit, Mich.

[22] Filed: July 10, 1970

[21] Appl. No.: 53,740

[52] U.S. Cl. ............................................. 242/107.4
[51] Int. Cl. ............................................. A62b 35/00
[58] Field of Search ....... 242/107 R, 107 SB, 107.4, 107.5, 242/107.6, 107.7; 297/386, 388, 389; 280/150 SB

[56] References Cited

UNITED STATES PATENTS

| | | | |
|---|---|---|---|
| 3,343,765 | 9/1967 | Baker | 242/107.4 |
| 3,074,761 | 1/1963 | Ryan | 242/107.4 X |
| 3,122,339 | 2/1964 | Whittingham | 242/107.4 |
| 3,190,579 | 6/1965 | Sponge et al. | 242/107.4 |
| 3,237,879 | 3/1966 | Whittingham | 242/107.4 |
| 3,273,822 | 9/1966 | Merrell et al. | 242/107.4 |

*Primary Examiner*—Werner H. Schroeder
*Attorney*—W. E. Finken and Herbert Furman

[57] ABSTRACT

A seat belt retractor includes a U-shaped support having generally vertically disposed closed end slots in the side walls thereof. A reel having ratchet toothed end plates and a shaft mounts a seat belt. The ends of the shaft are received within the slots of the support walls and torsion springs bias the shaft ends into engagement with the lower ends of the slots. The reel is spring biased in a belt retracting direction. A fixed shaft extends between the side walls of the support. A pawl includes closed end slots in the side walls thereof receiving the shaft for various modes of movement of the pawl relative to the shaft. In one mode of movement the pawl shifts bodily with respect to the shaft. In a mode of movement, the pawl pivots with respect to the shaft about an axis normal to the shaft axis and located adjacent one end of the pawl. In a third mode of movement, the pawl rotates about the axis of the fixed shaft. A spring normally locates the pawl in spaced parallel relationship to the toothed end plates of the reel and with the slots in the pawl side walls having one end thereof in engagement with the fixed shaft. When belt acceleration or movement of the belt in an extending direction exceeds a predetermined rate, the reel moves bodily upwardly with respect to the support as the shaft ends move upwardly within the slots of the support walls and the end plates of the reel engage cooperating teeth on the support walls to block further rotation of the reel in a belt extending direction. When the pawl is subjected to an acceleration pulse of predetermined amplitude and time directed laterally thereof and generally normal to the direction of bodily movement of the reel, the pawl shifts bodily relative to the fixed shaft and engages the end plates of the reel. A slight rotation of the reel in belt extending direction rotates the pawl about the fixed shaft until the side walls of the pawl engage the support. The pawl then provides a fulcrum for movement of the reel bodily upwardly so that the end plates of the reel engage the cooperating teeth on the support walls. When the pawl is subjected to an acceleration pulse of predetermined amplitude and time directed generally longitudinally thereof, the pawl pivots about one end thereof with respect to the fixed shaft so that the other end of the pawl engages the ratchet plates of the reel and provides a fulcrum for movement of the reel bodily upwardly after slight rotation of the reel in a belt extending direction rotates the pawl to engage the side plate of the other end of the pawl with the support.

5 Claims, 6 Drawing Figures

PATENTED OCT 3 1972　　3,695,545

INVENTOR.
Theodore F. Peters
BY
Herbert Furman
ATTORNEY

SEAT BELT RETRACTOR

This invention relates to seat belt retractors and more particularly to seat belt retractors of the inertia type.

The retractor of this invention is similar to that disclosed and claimed in copending application Ser. No. 50,564, filed June 29, 1970, Meyer, assigned to the assignee of this invention, in that it includes a reel mounted on a support for both rotational and bodily shifting movement relative thereto, with the reel being normally rotatable relative to the support to permit free movement of the belt in extending and retracting directions. When the reel moves bodily relative to the support through a predetermined distance, the reel cooperatively engages the support and further rotation of the reel in a belt extending direction is blocked. The bodily movement of the reel relative to the support may result solely from belt acceleration forces or from engagement of the reel with a movable pawl which acts as a fulcrum for the reel. The pawl engages the reel when it is subjected to acceleration pulses of predetermined amplitude and time.

The retractor of this invention differs from the above-noted retractor in that the pawl is mounted on a fixed shaft for both rotational movement about the shaft and bodily shiftable movement relative thereto. The pawl is bodily shiftable relative to the fixed shaft and into engagement with the end plates of the reel under an acceleration pulse directed generally normal to the direction of bodily movement of the reel. When the pawl so moves into engagement with the reel, a subsequent slight rotation of the reel in a belt extending direction engages the pawl and the support as the pawl rotates about the fixed shaft. The pawl then provides a fulcrum for bodily shiftable movement of the reel into cooperative engagement with the support upon any further movement of the belt in an extending direction. When an acceleration pulse of predetermined amplitude and time is received by the pawl in a direction generally longitudinally thereof or generally parallel to the reel axis, one end of the pawl pivots with respect to the fixed shaft about an axis directed generally normal to this shaft. The other end of the pawl thereby moves into engagement with the reel and subsequently provides a fulcrum for the reel after a slight rotation of the pawl about the fixed shaft to engage the support. Normally the pawl is located out of engagement with the reel and the support by a torsion spring interconnecting the pawl, the support and the fixed shaft.

It is therefore the primary object of this invention to provide a belt retractor of the inertia type wherein movement of a reel to an engaged position blocking rotation of the reel in a belt extending direction is controlled by a pawl which may bodily shift into engagement with the reel or pivot about one end thereof to engage the other end thereof with the reel when the pawl is subjected to an acceleration pulse of predetermined amplitude and time in a particular direction.

This and other objects of the retractor of this invention will be readily apparent from the following specification and drawings wherein.

Figure 1:
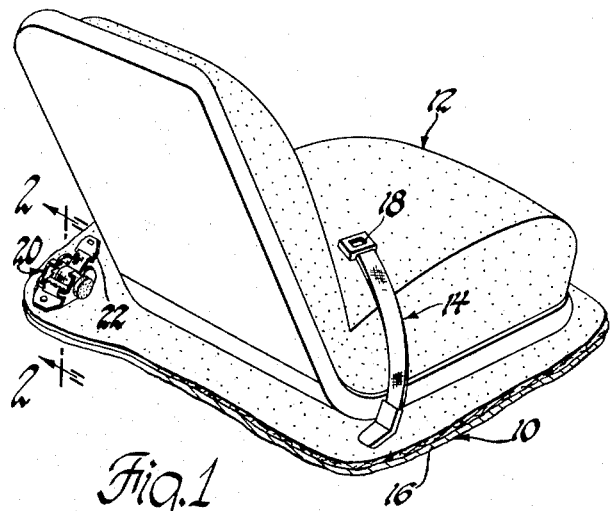
FIG. 1 is a partial perspective view of a vehicle body having a seat mounted thereon and a lap belt assembly provided for the occupant of the seat, with the outboard belt being provided with a retractor according to this invention.

Referring now particularly to FIG. 1 of the drawings, a vehicle designated generally 10 includes a seat 12 conventionally mounted thereon. The seat 12 is provided with a lap belt assembly which includes an inboard belt 14 of fixed length having one end thereof conventionally anchored to the floor pan 16 of the vehicle and having the other end thereof provided with a conventional push button buckle 18. The outboard belt 22 is mounted on the vehicle by a retractor 20 according to this invention for movement between a fully retracted position as shown in FIG. 1 and an extended position, not shown, wherein the D-ring of the outboard belt is latchingly engaged with the buckle 18 of the inboard belt to provide a lap belt for an occupant seated on the seat 12.

Referring now particularly to FIGS. 2 through 4 and 6 of the drawings, the retractor 20 includes a generally U-shaped support or frame 24 having a base wall 26 bolted at 28 to the floor pan 16 of the vehicle 10. The spaced generally parallel side walls 30 of the support 24 extend normal to the base wall 26 and each is provided with an elongated, generally double-D shaped closed end slot 32, with these slots being aligned longitudinally of the frame 24.

A reel designated generally 34 includes a shaft 36 and a pair of toothed end plates or ratchet plates 38 fixedly secured to the shaft. The ends of the shaft extend beyond the ratchet plates 38 and are freely rotatably and movably received within respective slots 32. Coil torsion springs 40 have one end thereof anchored in apertures in each of the walls 30 and the other ends thereof suitably shaped for engagement with respective ends of the shaft 36 to thereby locate the ends of the shaft in engagement with the lower ends of slots 32 and locate the reel 34 in what may be termed a normal operating position as shown in FIG. 2.

Figure 2:
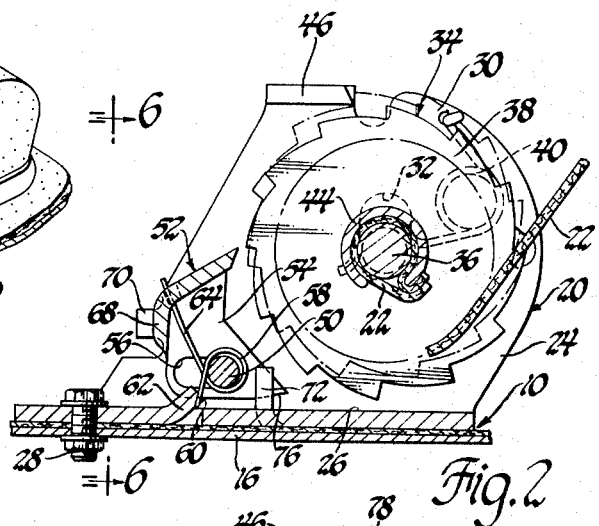
FIG. 2 is an enlarged view taken generally along the plane indicated by line 2—2 of FIG. 1 and showing the retractor in full lines in normal position wherein the reel is freely movable in both belt extending and belt retracting directions and showing the reel in dotted lines in blocked position wherein movement of the reel in an extending direction is blocked.
Figure 3:
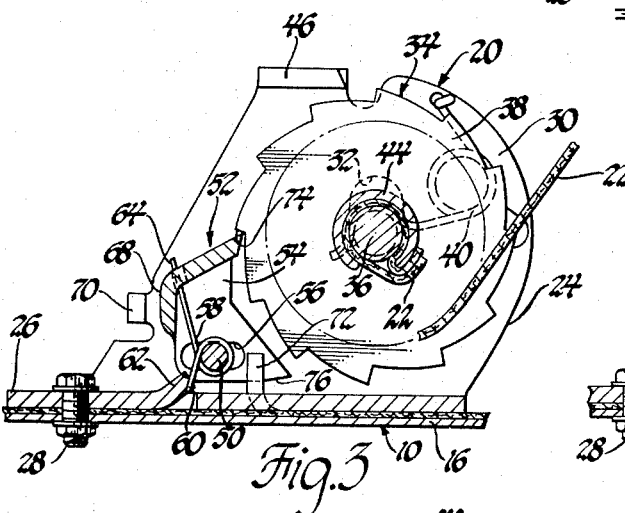
FIG. 3 is a view similar to FIG. 2 showing the pawl in a bodily shifted position in engagement with the reel.
Figure 4:
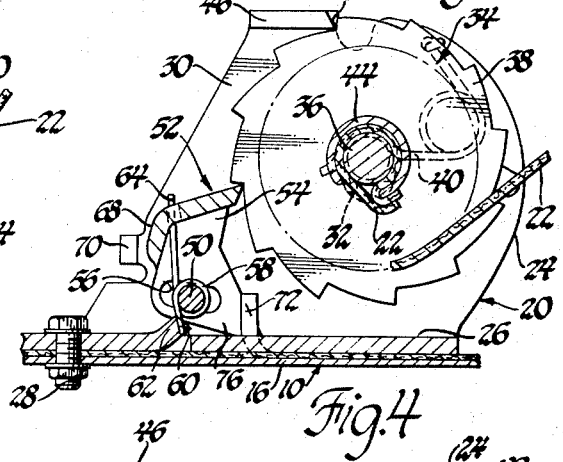
FIG. 4 is a view similar to FIG. 3 showing the subsequent rotation of the pawl into engagement with the support to provide a fulcrum for movement of the reel upwardly with respect to the support to blocked position wherein movement of the belt in an extending direction is blocked.
Figure 5:
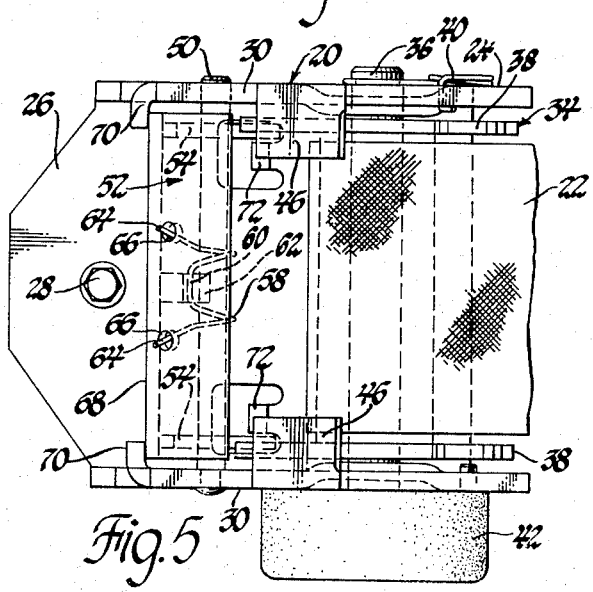
FIG. 5 is a plan view of the retractor in normal position.
Figure 6:
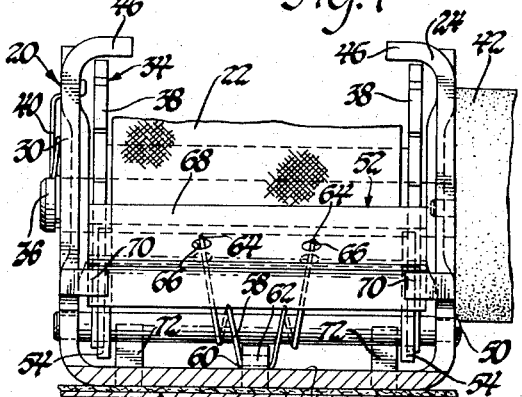
FIG. 6 is a view taken generally along the plane indicated by line 6—6 of FIG. 2.

As shown in FIGS. 5 and 6, a circular housing 42 is conventionally mounted on one side wall 30 and houses a conventional clock spring, not shown, having one end thereof slidably anchored to the housing and the other end thereof suitably anchored to one end of the shaft 36 to continually bias the reel 34 in a belt retracting direction or clockwise as viewed in FIGS. 2, 3 and 4. The clock spring moves with the reel 34 relative to the frame 24 when the reel moves relative to the frame and normally maintains the belt 22 in a fully retracted position as shown in FIG. 1. The belt 22 has its inner end looped over the shaft 36, as shown in FIGS. 2 through 4, and retained in place by a C-clip 44 extending between the ratchet plates 38. The clock spring housed within housing 42 does not resist movement of the reel 34 upwardly with respect to the frame 24. As shown in FIG. 2, the reel 34 is normally free to rotate in both clockwise and counterclockwise directions, respectively belt retracting and belt extending directions, and permit free movement of the seated passenger relative to the seat and to the lap belt provided by belts 14 and 22.

The side walls 30 of the frame 24 are each provided with a laterally inwardly extending tab or tooth 46. The teeth 46 extend toward each other as shown in FIG. 6 and are located in predetermined spaced relationship to the lower ends of the slots 32. Should the belt 22 be extended at a rate exceeding a predetermined rate due to movement of the seated passenger relative to the seat, the reel 34 will shift upwardly from its full line FIG. 2 position to its dotted line position shown therein as the ends of shaft 36 move upwardly within slots 32 against the action of the torsion springs 40. When the reel moves upwardly, a pair of aligned teeth of the end plates 38 will engage the teeth 46 to thereby block any further counterclockwise rotation of the reel or movement of the reel in a belt extending direction. The rate of belt extension required to move the reel 34 upwardly is predetermined and is a function of the reel mass, the friction between the reel and the side walls 30, and the springs 40 which function as threshold springs. Upon cessation or reduction of the required rate of acceleration of the belt 22 in an extending direction, the springs 40 return the reel 34 to its full line position shown in FIG. 2 to again permit free extension of the belt.

A fixed shaft or pin 50 extends between the side walls 30 of frame 24 and is fixedly secured thereto in a conventional manner. A pawl 52 includes a pair of lateral flanges or side walls 54 provided with elongated closed end slots 56 which slidably receive the shaft 50 therethrough to mount the pawl 52 on the frame 24. A torsion spring 58 is mounted on the shaft 50 and has a bight portion 60 anchored to a lanced tab 62 of wall 26 and free leg portions 64 extending through apertures 66 in the pawl 52 as shown in FIGS. 5 and 6. Normally the torsion spring 58 biases the pawl 52 laterally away from the end plates 38 of reel 34 to locate the right-hand ends of the slots 56 in engagement with the shaft 50, and also biases the pawl 52 counterclockwise of the shaft so that a wall 68 of the pawl engages a pair of lateral tabs 70 of the side walls 30 of frame 24. Pawl 52 is thus normally located as shown in FIG. 2 out of engagement with any of the teeth of the end plates 38.

As best shown in FIGS. 5 and 6, the base wall 26 of frame 24 includes a pair of spaced aligned upwardly extending tabs or cams 72 each of which is located immediately adjacent of and inboard of a respective wall 54 of pawl 52.

Should the pawl 52 receive an acceleration pulse of predetermined amplitude and time which is directed generally horizontally and laterally to the axis of shaft 36 of the reel 34, the pawl shifts bodily to the right relative to the shaft 50 from its FIG. 2 position to its FIG. 3 position so that the pawl engages an axially aligned pair of teeth 74 of the end plates 38 of the reel. During this movement of the pawl 52, the wall 68 moves out of engagement with the tabs 70 and the spring 58 is partially direction, Upon a slight movement of the reel 34 in a belt extending direction, or counterclockwise as viewed in FIG. 3, the pawl 52 rotates slightly clockwise of the shaft 50 to its position shown in FIG. 4 wherein the lower edge portions 76 of walls 54 engage the base wall 26 of the frame 24. Upon any further movement of the reel in a belt extending direction, pawl 52 provides a fulcrum for the reel and the reel bodily shifts upwardly of walls 30 so that another axially aligned pair of teeth 78 engage the teeth 46 to thereby effectively block any further rotation of the reel in a counterclockwise or belt extending direction. Upon cessation or reduction of the acceleration pulse, the pawl 52 will rotate slightly counterclockwise of the shaft 50 and bodily shift to the left to return to its position shown in FIG. 2 as the reel 34 returns to its position of FIG. 2 under the action of the springs 40.

Thus the pawl 52 can bodily shift relative to the shaft 50 and subsequently rotate slightly relative to this shaft to provide a fulcrum for the reel.

Should the generally horizontal acceleration pulse be received from either side of the retractor 20, or generally normal to a wall 30 and generally parallel to the axis of the shaft 36, the pawl 52 will bodily shift slightly axially of the shaft 50 to engage a wall 54 with a respective tab 72 and then subsequently the pawl will pivot about this point of engagement, either clockwise or counterclockwise as viewed in FIG. 5. This rotational movement of the pawl is permitted by the relative movement of the slots 56 relative to the shaft 50. As the pawl so pivots, the unengaged end thereof moves into engagement with one of the teeth of the end plate 38 of the reel adjacent the unengaged end to thereby block any further rotation of the reel. Upon subsequent slight belt extension, the pawl 52 will pivot about the shaft 50, as previously described in conjunction with FIGS. 3 and 4 to again provide a fulcrum for movement of the reel 34 upwardly to blocked position. The determination of which side wall of the pawl engages a respective tab 72 results from the direction of the acceleration pulse.

Although the acceleration pulses have been described as being generally normal or parallel with respect to certain walls or axes, it will be understood that the pulses need not be exactly normal or parallel in order for the pawl 52 to move relative to the shaft 50 and provide a fulcrum for movement of the reel 34 to blocked position.

Thus, this invention in combination, a retractor responsive to both belt acceleration forces and acceleration pulses of predetermined amplitude and time.

I claim:

1. A seat belt retractor comprising, in combination, a support, a reel mounting a belt for extension and retraction relative thereto, means mounting the reel on the support for rotation about an axis in belt extending and retracting directions and bodily movement through a predetermined distance in a plane containing such axis upon rotation of the reel by the belt at a rate exceeding a predetermined rate, cooperating means on the reel and support engageable with each other to block rotation of the reel about the axis of rotation thereof upon bodily movement of the reel through the predetermined distance, elongated blocking means, means mounting the blocking means on the support for rotational movement in a plane generally parallel to said reel axis and about an axis located adjacent one end of the blocking means being normal to said reel axis, said blocking means moving in response to an acceleration pulse of predetermined amplitude and time in the direction parallel to said reel axis, and means including cooperatively engageable means on the blocking means and reel engageable upon rotation of the blocking means about the axis thereof to block rotation of the reel and furnish a fulcrum for movement of the reel through the predetermined distance to engage the cooperating means on the reel and support.

2. A seat belt retractor comprising, in combination, a support, a reel mounting a belt for extension and retraction relative thereto, means mounting the reel on the support for rotation about an axis in belt extending and retracting directions and bodily movement through a predetermined distance in a plane containing such axis upon rotation of the reel by the belt at a rate exceeding a predetermined rate, cooperating means on the reel and support engageable with each other to block rotation of the reel about the axis of rotation thereof upon bodily movement of the reel through the predetermined distance, means on the support defining a fixed axis extending generally parallel to the reel axis, blocking means, means mounting the blocking means on the fixed axis means for bodily shifting movement relative to the fixed axis and rotational movement about an axis directed generally normal of the fixed axis, the blocking means being movable in at least one mode of movement with respect to the fixed axis in response to an acceleration pulse of predetermined amplitude and time, and including including cooperatively engageable means on the blocking means and reel engageable upon at least one mode of movement of the blocking means relative to the fixed axis to block rotation of the reel and furnish a fulcrum for movement of the reel through the predetermined distance to engage the cooperating means on the reel and support.

3. A seat belt retractor comprising, in combination, a support, a reel mounting a belt for extension and retraction relative thereto, means mounting the reel on the support for rotation about an axis in belt extending and retracting directions and bodily movement through a predetermined distance in a plane containing such axis upon rotation of the reel by the belt at a rate exceeding a predetermined rate, cooperating means on the reel and support engageable with each other to block rotation of the reel about the axis of rotation thereof upon bodily movement of the reel through the predetermined distance, elongated blocking means, means mounting the blocking means on the support for bodily shifting movement in a direction generally normal to the reel and rotational movement about an axis adjacent one end thereof and directed generally normal to the direction of the reel axis, the blocking means being bodily shiftable or rotational with respect to the reel in response to an acceleration pulse of predetermined amplitude and time, and means including cooperatively engageable means on the blocking means and reel engageable upon either mode of movement of the blocking means to block rotation of the reel and furnish a fulcrum for movement of the reel through the predetermined distance to engage the cooperating means on the reel and support.

4. A seat belt retractor comprising, in combination, a support, a reel mounting a belt for extension and retraction relative thereto, means mounting the reel on the support for rotation about an axis in belt extending and retracting directions and bodily movement through a predetermined distance in a plane containing such axis upon rotation of the reel by the belt at a rate exceeding a predetermined rate, cooperating means on the reel and support engageable with each other to block rotation of the reel about the axis of rotation thereof upon bodily movement of the reel through the predetermined distance, means on the support defining a fixed axis extending generally parallel to the reel axis, elongated blocking means, means mounting the blocking means on the fixed axis means for rotational movement about either of a pair of axes located adjacent respective ends of the blocking means and directed generally normal of the fixed axis, the blocking means being rotational about one of the axes thereof in response to an acceleration pulse of predetermined amplitude and time, and means including cooperatively engageable means on the blocking means and reel engageable upon rotational movement of the blocking means about one of the axes thereof to block rotation of the reel and furnish a fulcrum for movement of the reel through the predetermined distance to engage the cooperating means on the reel and support.

5. A seat belt retractor comprising, in combination, a fixed support member, a reel mounting a belt for extension and retraction relative thereto, means mounting the reel on the support member for rotation about an axis in belt extending and retracting directions and bodily movement through a predetermined distance in a plane containing such axis upon rotation of the reel by the belt at a rate exceeding a predetermined rate, cooperating means on the reel and support member engageable with each other to block rotation of the reel about the axis of rotation thereof upon bodily movement of the reel through the predetermined distance, an elongated blocking member, a shaft on one member, the other member including at least one slot receiving the shaft to interconnect the support member and blocking member for bodily shifting and rotational movement of the blocking member relative to the shaft, the blocking means being movable about the shaft toward the reel in response to an acceleration pulse of predetermined amplitude and time, and means including cooperatively engageable means on the blocking member and reel engageable upon movement of the blocking member relative to the shaft thereof to block rotation of the reel and furnish a fulcrum for movement of the reel through the predetermined distance to engage the cooperating means on the reel and support.

* * * * *

PO-1050
(5/69)

UNITED STATES PATENT OFFICE
CERTIFICATE OF CORRECTION

Patent No. 3,695,545          Dated October 3, 1972

Inventor(s) Theodore F. Peters

It is certified that error appears in the above-identified patent and that said Letters Patent are hereby corrected as shown below:

Column 4, line 2, "direction," should read -- wound. --.

Column 4, line 52, "in combination," should read

-- provides --.

Column 5, line 34, "including" (first occurrence) should read -- means --.

Signed and sealed this 22nd day of May 1973.

(SEAL)
Attest:

EDWARD M. FLETCHER, JR.          ROBERT GOTTSCHALK
Attesting Officer                 Commissioner of Patents